2,078,913

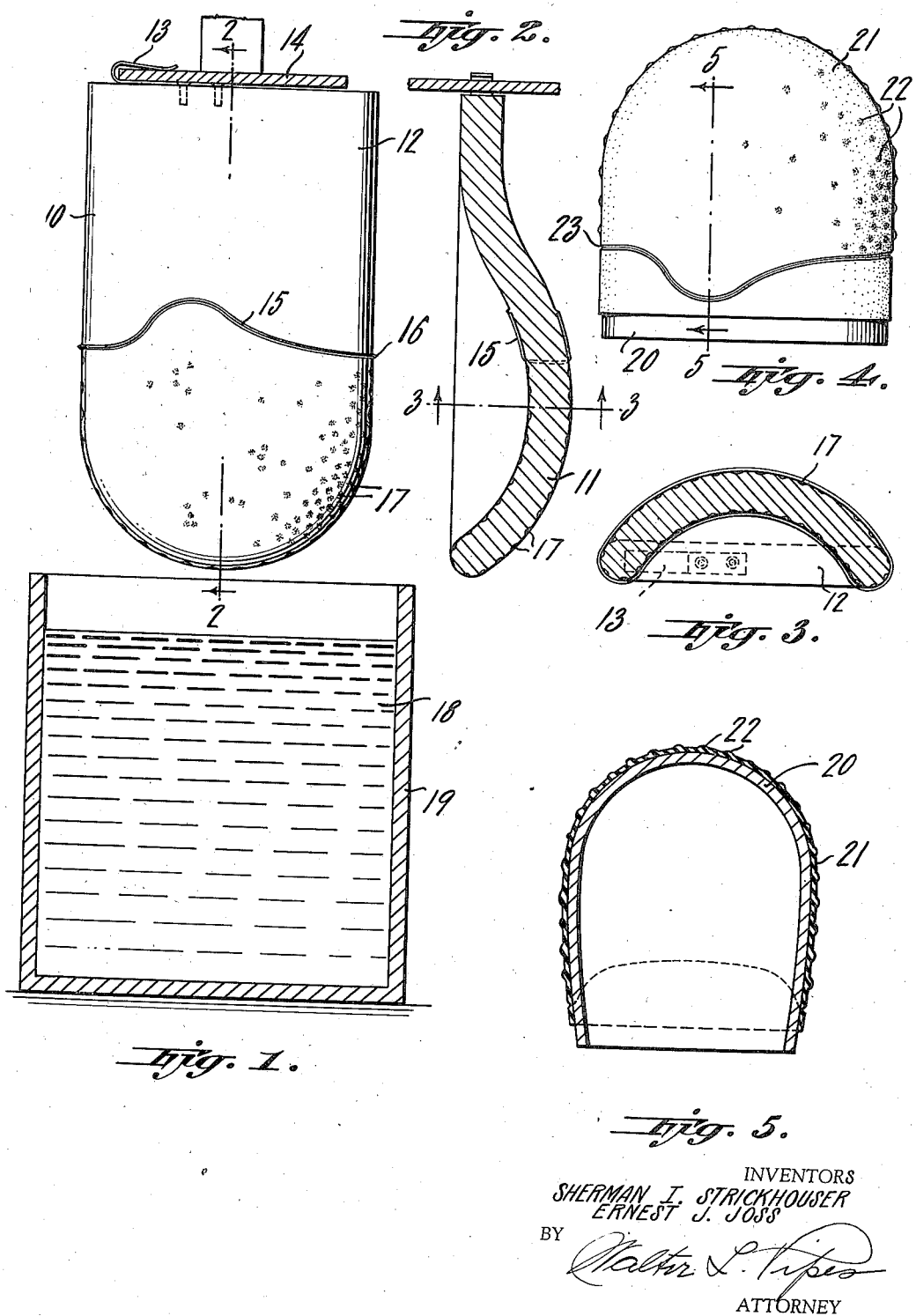
April 27, 1937. S. I. STRICKHOUSER ET AL 2,078,913
METHOD OF MAKING HOLLOW RUBBER ARTICLES
Filed Jan. 19, 1935
INVENTORS
SHERMAN I. STRICKHOUSER
ERNEST J. JOSS
BY
ATTORNEY Patented Apr. 27, 1937

UNITED STATES PATENT OFFICE 2,078,913

METHOD OF MAKING HOLLOW RUBBER ARTICLES

Sherman I. Strickhouser, Providence, and Ernest J. Joss, Cranston, R. I., assignors to United States Rubber Company, New York, N. Y., a corporation of New Jersey Application January 19, 1935, Serial No. 2,524

16 Claims. (Cl. 18—58)

This invention relates to the manufacture of hollow rubber articles having at least a portion of their surfaces spherical in shape and more particularly to the manufacture of head-shaped rubber caps.

Heretofore head-shaped rubber caps have either been made by a molding process in hollow molds or by shaping portions of sheet rubber on a head-shaped form and vulcanizing the same. Attempts have been made to make head-shaped bathing caps by dipping processes as by dipping head-shaped forms in rubber-containing fluids such as rubber solvent cement and aqueous dispersions of rubber such as latex, but these efforts have been unsuccessful commercially mainly because there resulted heavy spots and pin holes in the top of the cap as a result of snapping of the fluid from the rounded surface at the instant of withdrawal of the form from the dipping bath. In addition, head-shaped forms are heavy and bulky and relatively few forms can be placed on a dipping rack. Flat bathing cap dipping forms, by virtue of the reduced surface may readily be used to produce flat dipped bathing caps and the like, but when placed on the head or on a head-shaped form, such flat caps produce a series of wrinkles across the head, thereby detracting greatly from the appearance of the cap in use.

According to the present invention, head-shaped rubber caps and the like may readily be produced directly from rubber-containing fluids without the disadvantages of cumbersome head-shaped forms and the production of heavy spots and pin holes on the tops of the caps when made by a dipping operation.

One embodiment of the invention, illustrating the manufacture of a head-shaped cap, is shown in the accompanying drawing, in which:

Fig. 1 illustrates the dipping of a form according to the present invention;

Fig. 2 is a section on the line 2—2 of Fig. 1;

Fig. 3 is a section on the line 3—3 of Fig. 2;

Fig. 4 illustrates the transference of a cap dipped on the form of Figs. 1 to 3 to a head-shaped form; and Fig. 5 is a section on the line 5—5 of Fig. 4.

According to the present invention rubber is deposited from a rubber-containing fluid such as latex on the surface of a form having those portions of its surface scoop-shaped which correspond to spherical portions of the article to be made, and the deposit is removed from the scoop-shaped form and properly shaped as by transferring the same to a form having the desired spherical contour. In the manufacture of head-shaped rubber caps, for example, rubber is deposited on a scoop-shaped form and the deposit removed from the form and transferred to a head-shaped form for vulcanizing, which operation permanently shaped the deposit into a cap of the desired shape. If desired, the rubber-containing fluid may be applied to the scoop-shaped form by spraying rather than by a dipping operation. The surface of the scoop-shaped form may have any desired markings, in which case the outside of the article when finished will present a surface having the reverse of such markings if in transferring the article from the scoop-shaped form to the spherical form or other final shaping operation, the deposit is turned inside out. The article is preferably deposited on a scoop-shaped form from a vulcanizable latex with little, if any, accompanying vulcanization, and after stripping the same from the form it may be transferred to a head-shaped form for vulcanization. If desired, however, a so-called vulcanized or partially vulcanized latex may be used, in which case a final heating of the deposit on the spherical form will sufficiently complete the vulcanization and set the article to have it maintain permanently the desired spherical shape.

The article deposited on the scoop-shaped form preferably has the same surface area as intended in the finished article, but, if desired, the surface area of the scoop-shaped form may be somewhat less than desired in the finished article and the deposit stretched in being finally vulcanized or shaped on the spherical or head-shaped form.

Referring more particularly to the drawing which illustrates one embodiment of the invention, 10 is a dipping form having a scoop-shaped portion 11 and a base portion 12 to which is attached a clip 13 for the attachment as desired to a dipping rack 14. A ridged portion 15 on the surface of the form outlines a desired head-shaped cap, the sharp edge 16 of the ridge permitting easy trimming of the rubber deposited on the form. The surface of the form may have indentations thereon such as at 17, shown simulating a hammered article, in which case raised portions corresponding to these indentations will be formed in the completed article. The form as shown in Fig. 1 may be dipped in a rubber-containing fluid such as the latex 18 in tank 19. The form may then be withdrawn from the tank, the rubber deposited from the latex adhering to the form by a drying or chemical coagulation, and the dipping and coagulating or drying repeated until the desired thickness of deposit has been formed on the surface. After deposition of the rubber from the latex on the form, and preferably after drying, the deposit is removed from the form 10, turned inside out, and transferred to the head-shaped form 20 shown in Fig. 4. The rubber deposit 21 has raised portions 22 corresponding to indentations 17 on the surface of the scoop-shaped form, and a groove 23 corresponding to the ridge 16 of the form 10. Various trimmings may be placed on the article on form 20, if desired, before vulcanizing. The article is vulcanized on form 20, and after vulcanizing may be removed and readily trimmed along the groove 23 to complete the article, such as the head-shaped bathing cap, any trimmings placed on the article before vulcanization, being adhered permanently thereto.

As various modifications will occur to those skilled in the art, it is not intended to limit the invention other than as set forth in the appended claims.

Having thus described our invention, what we claim and desire to protect by Letters Patent is:

1. The process of making a hollow rubber article having at least a portion of its surface spherical in shape which comprises depositing rubber from a rubber containing fluid on a form, having those portions of its surface corresponding to spherical portions of the article to be made scoop-shaped, removing the deposit from the form, and shaping the article thus removed so that the portions of the surface corresponding to the scoop-shaped portions of the form are made spherical in shape.

2. The process of making a hollow rubber article having at least a portion of its surface spherical in shape, which comprises depositing solids of a rubber latex on a form, having those portions of its surface corresponding to spherical portions of the article to be made scoop-shaped, removing the deposit from the form, and shaping the article thus removed so that the portions of the surface corresponding to the scoop-shaped portions of the form are made spherical in shape.

3. The process of making a hollow rubber article having at least a portion of its surface spherical in shape, which comprises depositing solids of a vulcanizable rubber latex on a form, having those portions of its surface corresponding to spherical portions of the article to be made scoop-shaped, removing the deposit from the form, and vulcanizing the article thus removed in the desired spherical shape.

4. The process of making a hollow rubber article having at least a portion of its surface spherical in shape, which comprises depositing solids of a rubber latex on a form, having those portions of its surface corresponding to spherical portions of the article to be made scoop-shaped, removing the deposit from the form, and vulcanizing the article thus removed on a form of the desired spherical shape.

5. The process of making a hollow rubber article having at least a portion of its surface spherical in shape, which comprises dipping a form, having those portions of its surface corresponding to spherical portions of the article to be made scoop-shaped, into a rubber-containing fluid, removing the form from the rubber-containing fluid with the scoop-shaped portions last to emerge, and depositing rubber from the rubber-containing fluid on the surface of the form, removing the deposit from the form, and shaping the article thus removed so that the portions of the surface corresponding to the scooped-shaped portions of the form are made spherical in shape.

6. The process of making a hollow rubber article having at least a portion of its surface spherical in shape, which comprises dipping a form, having those portions of its surface corresponding to spherical portions of the article to be made scooped-shaped, into a bath of latex, removing the form from the latex with the scooped-shaped portions last to emerge from the latex and solidifying the latex on the surface of the form, removing the deposit from the form, and shaping the article thus removed so that the portions of the surface corresponding to the scooped-shaped portions of the form are made spherical in shape.

7. The process of making a hollow rubber article having at least a portion of its surface spherical in shape, which comprises dipping a form, having those portions of its surface corresponding to spherical portions of the article to be made scooped-shaped, into a bath of a vulcanizable latex, removing the form from the latex with the scooped-shaped portions last to emerge from the latex and solidifying the latex on the surface of the form, removing the deposit from the form, and vulcanizing the article thus removed in the desired spherical shape.

8. The process of making a hollow rubber article having at least a portion of its surface spherical in shape, which comprises dipping a form, having those portions of its surface corresponding to spherical portions of the article to be made scooped-shaped, into a bath of latex, removing the form from the latex with the scooped-shaped portions last to emerge from the latex and solidifying the latex on the surface of the form, removing the deposit from the form, and vulcanizing the article thus removed on a form of the desired spherical shape.

9. The process of making a head-shaped rubber cap which comprises depositing rubber from a rubber-containing fluid on a form having those portions of its surface corresponding to the spherical portions of the cap to be made scoop-shaped, removing the deposit from the form, and head-shaping the cap.

10. The process of making a head-shaped rubber cap which comprises depositing solids of a rubber latex on a form having those portions of its surface corresponding to the spherical portions of the cap to be made scoop-shaped, removing the deposit from the form, and head-shaping the cap.

11. The process of making a head-shaped rubber cap which comprises depositing vulcanizable solids of a rubber latex on a form having those portions of its surface corresponding to the spherical portions of the cap to be made scoop-shaped, removing the deposit from the form, and vulcanizing the cap in head shape.

12. The process of making a head-shaped rubber cap which comprises depositing vulcanizable solids of a rubber latex on a form having those portions of its surface corresponding to the spherical portions of the cap to be made scoop-shaped, removing the deposit from the form, and vulcanizing the cap on a head-shaped form.

13. The process of making a head-shaped rubber cap which comprises dipping a form having those portions of its surface corresponding to the spherical portions of the cap to be made scoop-shaped, into a bath of vulcanizable latex, removing the form from the latex and solidifying the latex on the surface of the form, removing the deposit from the form, and vulcanizing the cap on a head-shaped form.

14. The process of making a head-shaped rubber cap which comprises dipping a form having those portions of its surface corresponding to the spherical portions of the cap to be made scoop-shaped, into a bath of vulcanizable latex, removing the form from the latex and solidifying the latex on the surface of the form, removing the deposit from the form, and vulcanizing the cap on a head-shaped form, having approximately the same surface area for reception of the cap as the dipping form.

15. The process of making a head-shaped rubber cap which comprises dipping a form having those portions of its surface corresponding to the spherical portions of the cap to be made scoop-shaped, into a bath of vulcanizable latex, removing the form from the latex with the scoop-shaped portions last to emerge from the latex, and solidifying the latex on the surface of the form, removing the deposit from the form, and vulcanizing the cap on a head-shaped form.

16. The process of making a head-shaped rubber cap which comprises dipping a form having those portions of its surface corresponding to the spherical portions of the cap to be made scoop-shaped, into a bath of vulcanizable latex, removing the form from the latex with the scoop-shaped portions last to emerge from the latex and solidifying the latex on the surface of the form, removing the deposit from the form, and vulcanizing the cap on a head-shaped form having approximately the same surface area for reception of the cap as the dipping form.

SHERMAN I. STRICKHOUSER.
ERNEST J. JOSS.